Aug. 24, 1926.
J. N. DE VLIEG
1,597,148
REAMER
Filed Oct. 22, 1924
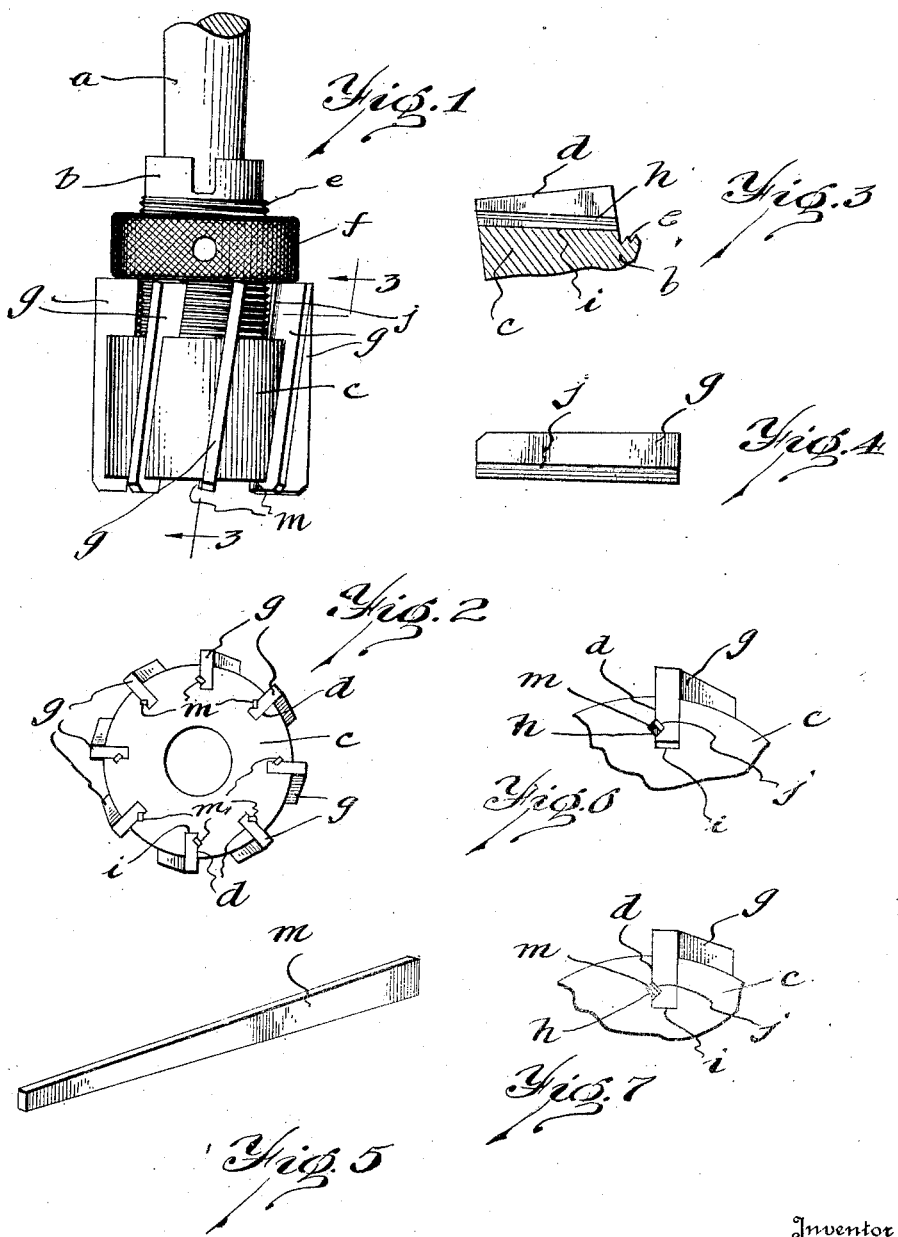
Inventor
Jay N. DeVlieg
By Stuart C. Barnes
Attorney Patented Aug. 24, 1926.

1,597,148

UNITED STATES PATENT OFFICE.

JAY N. DE VLIEG, OF DETROIT, MICHIGAN.

REAMER.

Application filed October 22, 1924. Serial No. 745,165.

This invention relates to a tool, more particularly directed to a reamer in which the cutting blades are detachably secured to the body or holder.

It has for its object the provision of means whereby the blades may be secured in the holder with the minimum amount of effort, and in addition this securing means is obtained by the use of a fewer number of parts, thereby lessening the cost of manufacture and the cost of assembling the blades in the holder. Another advantage is that these blades may be quickly secured in the holder which permits a quick adjustment of the blades when the same become worn. In addition, my securing means wedges the blade in the holder in such a manner as to force the same against the bottom of the slot thereby providing a rigid support for the blade. It prevents any chance of the same working loose or breaking when the tool is being used.

In the drawings:

Fig. 1 is a side elevation of my tool.

Fig. 2 is an end view thereof.

Fig. 3 is a detail taken substantially on the line 3—3 of Fig. 2, showing the grooved slot in the holder.

Fig. 4 is a detail in elevation of the cutting blade.

Fig. 5 is a detail in perspective of the tapered key.

Fig. 6 is a detail showing the assembly before the tapered key is driven home.

Fig. 7 is a similar detail showing the position of the parts after the tapered key has been driven home, thereby wedging the blade against the bottom of the slot.

Secured to the driving spindle $a$ of a drill press or other suitable machine, is a holder $b$. In the drawings I have shown a reamer, though obviously other forms of rotating tools may utilize the principle of the invention involved herein. The end of the holder is enlarged as at $c$ and is provided with a plurality of slots $d$ which are slightly inclined to the longitudinal axis of the holder. The reduced portion of the holder is screw threaded as at $e$, and an adjusting nut $f$ is screwed on these threads and arranged to abut the end of the blades $g$ which are fitted into the slots $d$. In this way the blades may be all adjustably positioned in the holder with one operation of the adjusting nut.

This invention relates specifically to the means for securing the blades in the holder. The holder is provided with a V-shaped groove $h$ in one of the side walls of each slot $d$, this groove being inclined to the bottom $i$ of the slot, as clearly shown in Fig. 3. Each blade is provided with a V-shaped groove $j$ which is parallel to the bottom edge of the blade, as clearly shown in Fig. 4, and has a greater relative depth than the V-shaped groove in the holder for a purpose later to be described. A tapered key $m$ is provided and arranged to be driven in between the blade and the holder and engaging in the V-shaped grooves carried thereby.

This key is tapered in one plane only and may be manufactured in large quantities by merely stamping the same out of sheet metal with a suitable punch press. This key is so inserted that the tapered edges of the same will engage the outward wall of the groove in the holder and the inner wall of the groove in the blade. This is clearly shown in Figs. 6 and 7. In Fig. 6 the tapered key has not been driven home, and it will be seen that the blade is not seated on the bottom of the slot. However, as the key is driven home the taper of the same forces the blade inwardly against the bottom of the slot, and when the blade is seated firmly against the bottom of the slot, a sharp tap with a hammer on the end of the key will wedge the key between the holder and blade, and due to the fact that the groove $h$ and the key are provided with only a slight taper, approximately one degree, this wedging action is sufficient to securely clamp the blade in position.

The purpose of making the groove $j$ of a greater relative depth than the groove $h$ is for the purpose of providing clearance to allow the blade to be forced inwardly in the slot. It will be noticed that the blade and the holder have relative movement when the key is driven home, which causes the blade to slide inwardly in the slot, and the size of the groove $j$ is such that when the blade is forced entirely inwardly against the bottom of the slot there is a clearance between the side of the key and the upper side wall of the groove $j$. This clearance is provided solely for the purpose of allowing such relative movement between the blade and the holder.

What I claim is:

1. In a tool, the combination of a holder provided with one or more slots having a groove in one of the side walls of the slot, a cutting blade fitted in said slot and provided with a groove, and a key driven into said grooves longitudinally between the blade and holder and arranged to have clearance between one side of the key and the blade groove wall and also a wedging action to force the blade inwardly against the bottom of the slot and to secure the blade in such position, the said clearance permitting this relative movement between the cutting blade and holder.

2. In a tool, the combination of a holder provided with one or more slots having a V-shaped groove in one of the side walls of said slot and which is inclined slightly with respect to the bottom of the slot, a cutting blade fitted in said slot and provided with a V-shaped groove, and a tapered key rectangular in cross section driven in said grooves between the blade and the holder and arranged to have a wedging action between the blade and the holder to force the blade inwardly against the bottom of the slot and to secure the blade in such position.

3. In a tool, the combination of a holder provided with one or more slots having a V-shaped groove in one of the side walls thereof, a cutting blade fitted in said slot and provided with a V-shaped groove, and an angular section key driven in said grooves between the blade and the holder and arranged to have a wedging action to force the blade inwardly against the bottom of the slot and to secure the blade in such position, the groove in said cutting blade having a greater width than the thickness of the key for providing sufficient clearance to permit such relative movement.

4. In a tool, the combination of a holder provided with one or more slots having a V-shaped groove in one of the side walls of said slot and which is inclined slightly with respect to the bottom of the slot, a cutting blade fitted in said slot and provided with a V-shaped groove, and a tapered key rectangular in cross section driven in said grooves between the holder and the blade, the tapered edges of said key arranged to engage the outer side wall of the groove in the holder and the inner side wall of the groove in the blade and to have a wedging action therebetween to force the blade inwardly against the bottom of the slot and to secure the blade in such position, the side of the groove in the blade engaged by said key having a greater width than the thickness of the key to provide clearance to permit such movement of the blade.

5. In a tool, the combination of a holder provided with one or more slots having a V-shaped groove in one of the side walls of the slot and which is inclined with respect to the bottom of the slot, a cutting blade fitted in said slot and provided with a V-shaped groove, and a tapered key rectangular in cross section driven in said grooves between the blade and holder and arranged to have a wedging action therebetween and to engage the outer side wall of the groove and the holder and the inner side wall of the groove in the blade to force the blade inwardly against the bottom of the slot and to secure the blade in such position, the inner side wall of the groove in the blade having a greater width than the thickness of the key for providing sufficient clearance to permit such relative movement.

In testimony whereof I have affixed my signature.

JAY N. DE VLIEG.